(12) United States Patent
Bell et al.

(10) Patent No.: US 7,770,140 B2
(45) Date of Patent: Aug. 3, 2010

(54) METHOD AND APPARATUS FOR EVALUATING INTEGRATED CIRCUIT DESIGN MODEL PERFORMANCE USING BASIC BLOCK VECTORS AND FLY-BY VECTORS INCLUDING MICROARCHITECTURE DEPENDENT INFORMATION

(75) Inventors: Robert H. Bell, Austin, TX (US);
Thomas W. Chen, Austin, TX (US);
Venkat R. Indukuru, Austin, TX (US);
Pattabi M. Seshadri, Austin, TX (US);
Madhavi G. Valluri, Leander, TX (US)

(73) Assignee: International Business Machines Corporation, Armonk, NY (US)

( * ) Notice: Subject to any disclaimer, the term of this patent is extended or adjusted under 35 U.S.C. 154(b) by 207 days.

(21) Appl. No.: 12/026,141

(22) Filed: Feb. 5, 2008

(65) Prior Publication Data

US 2009/0199138 A1    Aug. 6, 2009

(51) Int. Cl.
*G06F 17/50* (2006.01)
(52) U.S. Cl. .............................................. 716/4; 716/1
(58) Field of Classification Search .................. 716/1, 716/4
See application file for complete search history.

(56) References Cited

U.S. PATENT DOCUMENTS

| 4,266,270 | A | | 5/1981 | Daniels |
| 5,263,153 | A | | 11/1993 | Intrater |
| 5,938,760 | A | | 8/1999 | Levine |
| 5,961,654 | A | | 10/1999 | Levine |
| 6,047,367 | A | | 4/2000 | Heller |
| 6,085,338 | A | | 7/2000 | Levine |
| 6,295,623 | B1 | * | 9/2001 | Lesmeister et al. .......... 714/741 |
| 6,466,898 | B1 | * | 10/2002 | Chan .......................... 703/17 |
| 2002/0116166 | A1 | * | 8/2002 | El-Ghoroury ................ 703/14 |
| 2004/0068701 | A1 | * | 4/2004 | Chang et al. .................... 716/4 |
| 2004/0111708 | A1 | * | 6/2004 | Calder et al. ................. 717/131 |
| 2007/0157177 | A1 | * | 7/2007 | Bouguet et al. ............. 717/128 |
| 2009/0182994 | A1 | * | 7/2009 | Bell et al. .................... 712/227 |
| 2009/0183127 | A1 | * | 7/2009 | Bell et al. ....................... 716/4 |

OTHER PUBLICATIONS

Wikipedia—"K-Means Algorithm"—Online Wikipedia Reference Material (Dec. 2007).

(Continued)

*Primary Examiner*—Jack Chiang
*Assistant Examiner*—Suchin Parihar
(74) *Attorney, Agent, or Firm*—Diana Gerhardt; Mark P Kahler

(57) ABSTRACT

A test system or simulator includes an IC test application sampling software program that executes test application software on a semiconductor die IC design model. The test application sampling software includes trace, simulation point, CPI error, clustering and other programs. IC designers utilize the test application sampling software to evaluate the performance characteristics of IC designs with test software applications. The test application sampling software generates basic block vectors (BBVs) and fly-by vectors (FBVs) from instruction trace analysis of test application software. The test application sampling software analyzes microarchitecture dependent information that it uses to generate the FBVs. Test application sampling software generates a reduced representative test application software program from the BBV and FBV data utilizing an instruction budgeting method. Designers use the test system with test application sampling software to evaluate IC design models by using the representative test application software program.

14 Claims, 8 Drawing Sheets

OTHER PUBLICATIONS

Robinson—"Initial Starting Point Analysis for K-Means clustering: A Case Study"—Proceedings of ALAR 2006 Conference on Applied Research in Information Technology (Mar. 2006).

Hamerly-1—"SimPoint 3.0: Faster and More Flexible Program Analysis"—Dept Computer Science and Engineering UC San Diego (Sep. 2005).

Hamerly-2—"How to Use Sim Point to Pick Simulation Points"—Dept Computer Science and Engineering UC San Diego (Mar. 2004).

Anderson—"Continuous Profiling: Where Have All the Cycles Gone?"—Digital Equipment Corporation (Oct. 13, 1999).

Eyerman—"A Performance Counter Architecture for Computing Accurate CPI Components"—Proceedings of the 12th International Conference on Architectural Support for Programming Languages and Operating Systems (2006).

Azimi—"Online Performance Analysis by Statistical Sampling of Microprocessor Performance Counters"—Proceedings of the 19th Annual International Conference on Supercomputing (2005).

Luo—"Automatically Selecting Representative Traces for Simulation Based on Cluster Analysis of Instruction Address Hashes"—The University of Texas at Austin IBM Server Group (2005).

Wunderlich-1—"An Evaluation of Stratified Sampling on Microarchitecture Simulations"—Computer Architecture Laboratory ISCA-31 (Jun. 2004).

Wunderlich-2—"Smarts: Accelerating Microarchitecture Simulation via Rigorous Statistical Sampling"—International Symposium on Computer Architecture ISCA-30 (Jun. 2003).

Wunderlich-3—"TurboSmarts: Accurate Microarchitecture Simulation Sampling in Minutes"—Computer Architecture Lab at Carnegie Mellon CALCM (2004).

Taufer—"Scalability and Resource Usage of an OLAP Benchmark on Cluster of PCs"—Proceedings of 14th Annual ACM Symposium on Parallel Algorithms and Architectures (2002).

Puzak—"An Analysis of the Effects of Miss Clustering on the Cost of a Cache Miss"—IBM SIGMICRO—(2007).

Annavaram—"The Fuzzy Correlation between Code and Performance Predictability"—Proceedings of the 37th International Symposium on Microarchitecture (2004).

Lau-1—"Transition Phase Classification and Prediction"—11th International Symposium on High Performance Computer Architecture, Feb. 2005.

Lau-2—"The Strong Correlation Between Code Signatures and Performance"—IEEE International Symposium on Performance Analysis of Systems and Software, Mar. 2005.

Laurenzano—"Low Cost Trace-driven Memory Simulation Using SimPoint"—Workshop on Binary Instrumentation and Applications (held in conjunction with PACT2005), St. Louis, MO Sep. 2005.

Pereira—"Dynamic Phase Analysis for Cycle-Close Trace Generation"—International Conference on Hardware/Software Codesign and System Synthesis, Sep. 2005.

Sherwood-1—"Basic Block Distribution Analysis to Find Periodic Behavior and Simulation Points in Applications" In Proceedings of the International Conference on Parallel Architectures and Compilation Techniques (PACT), Sep. 2001.

Sherwood-2—"Automatically Characterizing Large Scale Program Behavior"—Architectural Support for Programming Languages and Operating Systems ASPLOS at University of California, San Diego (2002).

Lyengar—"Representative Traces for Processor Models with Infinite Cache"—IBM Research Division presented at the International Symposium on High Performance Computer Architecture HPCA (2005).

Perelman—"Picking Statistically Valid and Early Simulation Points"—Proceedings of the International Conference on Parallel Architectures and Compilation Techniques PACT (Sep. 2003).

SimPoint—"SimPoint Overview"—downloaded from http://www.cse.ucsd.edu/~calder/simpoint/phase_analysis.htm on Oct. 20, 2007.

* cited by examiner

INSTRUCTION SEGMENT OF MUCH LARGER TEST APPLICATION SOFTWARE PROGRAM

FIG. 3
(PRIOR ART)

300
CONVENTIONAL BASIC BLOCK VECTOR FORMAT
FROM GENERATION METHOD USING BASIC BLOCK
COUNTS FROM TEST APPLICATION SOFTWARE
EXECUTING WITH CONVENTIONAL TEST APPLICATION
SAMPLING SOFTWARE

BASIC BLOCK VECTOR 1 (BBV1)

| BB1-0 | BB1-1 | BB1-2 | ••• | BB1-47 |
|-------|-------|-------|-----|--------|
| 80    | 200   | 400   | ••• | 500    |

310-0, 310-1, 310-2, 310, 310-47

INSTRUCTION INTERVAL = 1$^{ST}$ 10 MILLION INSTRUCTIONS

BASIC BLOCK VECTOR 2 (BBV2)

| BB2-0 | BB2-1 | BB2-2 | ••• | BB2-47 |
|-------|-------|-------|-----|--------|
| 100   | 300   | 200   | ••• | 400    |

320-0, 320-1, 320-2, 320, 320-47

INSTRUCTION INTERVAL = 2$^{nd}$ 10 MILLION INSTRUCTIONS

BASIC BLOCK VECTOR N (BBVN)

| BBN-0 | BBN-1 | BBN-2 | ••• | BBN-X |
|-------|-------|-------|-----|-------|
|       |       |       | ••• |       |

330

INSTRUCTION INTERVAL = LAST 10 MILLION INSTRUCTIONS

500

FLY-BY VECTOR FORMAT
INCLUDING BASIC BLOCK VECTORS WITH RESPECTIVE INDEPENDENT
FLY-BY VECTOR (FBV) COUNTERPARTS FROM GENERATION METHOD
USING TEST APPLICATION SAMPLING SOFTWARE WITH FBV
EXECUTING TEST APPLICATION SOFTWARE ON AN IC DESIGN MODEL

FLY-BY VECTOR (FBV) EXAMPLES FOR FBV1 INCLUDING DATA DEPENDENT
INFORMATION FROM INSTRUCTION INTERVAL 1 BY GENERATION METHOD
USING TEST APPLICATION SAMPLING SOFTWARE WITH FBV EXECUTING
TEST APPLICATION SOFTWARE ON AN IC DESIGN MODEL

FLY-BY VECTOR 1 (FBV1) EXAMPLE 1 — 550

| FBV1-1 |
|---|
| L1 CACHE MISSES |
| 25 |

} MICROARCHITECTURE DEPENDENT INFORMATION

FLY-BY VECTOR 1 (FBV1) EXAMPLE 2 — 555

| FBV1-2 | |
|---|---|
| L1 CACHE MISSES | BRANCH MIS-PREDICT COUNT |
| 25 | 40 |

} MICROARCHITECTURE DEPENDENT INFORMATION

FLY-BY VECTOR 1 (FBV1) EXAMPLE 3 — 560

| FBV1-3 | | |
|---|---|---|
| L1 CACHE MISSES | L2 CACHE MISSES | L3 CACHE MISSES |
| 25 | 10 | 4 |

} MICROARCHITECTURE DEPENDENT INFORMATION

DUAL BBV AND FBV CLUSTERING
INCLUDING REDUCED TEST APPLICATION
SOFTWARE GENERATION METHOD

METHOD AND APPARATUS FOR EVALUATING INTEGRATED CIRCUIT DESIGN MODEL PERFORMANCE USING BASIC BLOCK VECTORS AND FLY-BY VECTORS INCLUDING MICROARCHITECTURE DEPENDENT INFORMATION

TECHNICAL FIELD OF THE INVENTION

The disclosures herein relate generally to information handling systems (IHSs) that operate as electronic design test systems, and more particularly, to a methodology and apparatus for evaluating performance characteristics of processors and other devices within integrated circuits (ICs) during IC design.

BACKGROUND

An information handling system (IHS) may include a processor for processing, handling, communicating or otherwise manipulating information. Modern IHSs often include integrated circuits (ICs) that incorporate several components integrated together on a common semiconductor die. Some IHSs operate as test systems that evaluate the functionality and performance characteristics of IC designs during the development process of the IC. A typical IC development process employs early design specifications that may include stringent requirements relating to the overall speed and throughput of the IC or other performance requirements. For example, a design requirement of a particular IC may demand that the IC functions without failure at a predetermined clock frequency. In another example, an IC design requirement may specify that a particular IC must execute standard test application sampling software to precise performance specifications.

With often stringent requirements on IC design performance, designers must develop extensive test strategies early in the IC development process. It is very common to apply these test strategies before the physical IC design hardware is complete. Designers develop computer or IC design models and test various parameters of the IC in a test simulation. The more detailed or accurate the IC design model for simulation, the more accurate the testing results become. However, more detailed IC models result in longer test application software execution times during testing.

Test strategies may involve extensive testing with large test application software in a simulation environment. Test application software is the software that test systems execute to test parameters of the IC design. This test application software may include large numbers of instructions that often number in the trillions. Due to the large number of instructions in these applications, it may not be feasible to run or execute a test application software program on an IC design model and still evaluate results in a timely manner. Hours of a typical test application software program execution in a real world processor may correspond to months of execution time on an IC design model within a simulator.

What is needed is a testing method and apparatus that addresses the problems faced by integrated circuit IC designers described above.

SUMMARY

Accordingly, in one embodiment, a method of integrated circuit (IC) design model testing is disclosed that includes providing a workload to a simulator test system, the workload including test application software exhibiting a first predetermined number of instructions. The method also includes grouping, by the simulator test system, the workload into a plurality of instruction intervals, each instruction interval including a second predetermined number of instructions of the workload. The method further includes generating, by the simulator test system, a plurality of basic block vectors (BBVs), each BBV being generated for a respective instruction interval. The method still further includes generating, by the simulator test system, a respective fly-by vector (FBV) for each BBV generated by the simulator test system, each FBV being generated independently of its respective BBV, but having in common a same instruction interval, each FBV including microarchitecture dependent information. The method may include clustering, by the simulator test system, the BBVs to form BBV cluster groups that represent code profile phases of the workload, and may further include clustering, by the simulator test system, the FBVs to form FBV cluster groups that represent microarchitecture dependent phases of the workload, the FBV clustering being independent of the BBV clustering. The simulator test system generates a reduced representative workload as specified by a total instruction budget that includes a BBV instruction budget and an FBV instruction budget. The simulator test system then executes the reduced representative workload on an IC design model.

In another embodiment, an integrated circuit (IC) design model simulator test system includes a processor and a memory store coupled to the processor. The memory store is coupled to the processor and includes an IC design model. The memory store is configured to receive a workload including test application software exhibiting a first predetermined number of instructions. The memory store is also configured to group the instructions of the workload into a plurality of instruction intervals, each instruction interval including a second predetermined number of instructions of the workload. The memory store is further configured to generate from the instructions of each instruction interval a respective basic block vector (BBV) corresponding to each instruction interval. The memory store is still further configured to generate a respective fly-by vector (FBV) for each BBV generated by the simulator test system, each FBV being generated independently of its respective BBV, but having in common a same instruction interval, each FBV including microarchitecture dependent information. The memory store is also configured to cluster the BBVs to form BBV cluster groups that represent code profile phases of the workload, and is further configured to cluster the FBVs to form FBV cluster groups that represent microarchitecture-dependent phases of the workload, the FBV clustering being independent of the BBV clustering. The memory store is still further configured to generate a reduced representative workload as specified by a total instruction budget that includes a BBV instruction budget and an FBV instruction budget. The simulator test system then executes the reduced representative workload on an IC design model.

BRIEF DESCRIPTION OF THE DRAWINGS

The appended drawings illustrate only exemplary embodiments of the invention and therefore do not limit its scope because the inventive concepts lend themselves to other equally effective embodiments.

FIG. 3 is a representation of multiple basic block vectors that one IC design model evaluation methodology generates.

FIG. 5B is a representation of fly-by vector (FBV) examples of microarchitecture dependent information that the disclosed methodology generates.

DETAILED DESCRIPTION

A particular grouping and interconnection of transistors on the semiconductor die of an integrated circuit (IC) may form a component such as an AND gate, OR gate, flip flop, multiplexer, or other component. Complex IC designs, such as a PowerPC processor IC, may include billions of transistors or more. (PowerPC is a trademark of the IBM Corporation.) IC design and development includes the work of IC designers who generate detailed IC transistor, component, and interconnect schematics. IC designers develop software simulation models of a particular IC from these transistor, component, and interconnect schematics. Software simulation models are computer models or IC design models that depict the physical representation of a particular IC design in a virtual mode. By grouping transistors into components and interconnecting the components forming the detailed IC transistor and component schematics, designers develop an accurate IC design model.

An IC design model may include a collection of components with input and output signal characteristics. In other words, each component of the IC design model may include a truth table or other mechanism to predict the output signals of the component that result from particular input signals. A computer simulation may execute or run using the IC design model by providing simulated input signals and predicting or calculating resultant output signals. Ultimately, the collection of input signals and resultant output signals provides a detailed timing signal simulation. Designers may compare the signal simulation against known good signal characteristics of the IC design and determine if the IC design model is performing properly. Designers may also stress an IC design by simulating an increase in clock frequency or providing software applications that extensively test particularly sensitive areas of the IC design.

Simulation tools, such as "Simulation Program with Integrated Circuit Emphasis" (SPICE) software, originally a UC Berkeley development tool, are common tools of IC designers. SPICE may be particularly useful in the area of IC benchmark analysis. IC designers may use SPICE software to simulate analog and digital timing characteristics of the IC design under development. IC designers may use SPICE or other software to analyze an IC design to compare that design to IC design and performance requirements. It may be advantageous to provide benchmark analysis such as design and performance analysis prior to hardware production of the IC to avoid or shorten the costly process of building the IC, testing the IC, and redesigning the IC until achieving acceptable results. In one example, IC integrators use the output of the SPICE software model or a collection of IC timing results as input into the IC benchmark process.

Figure 1:
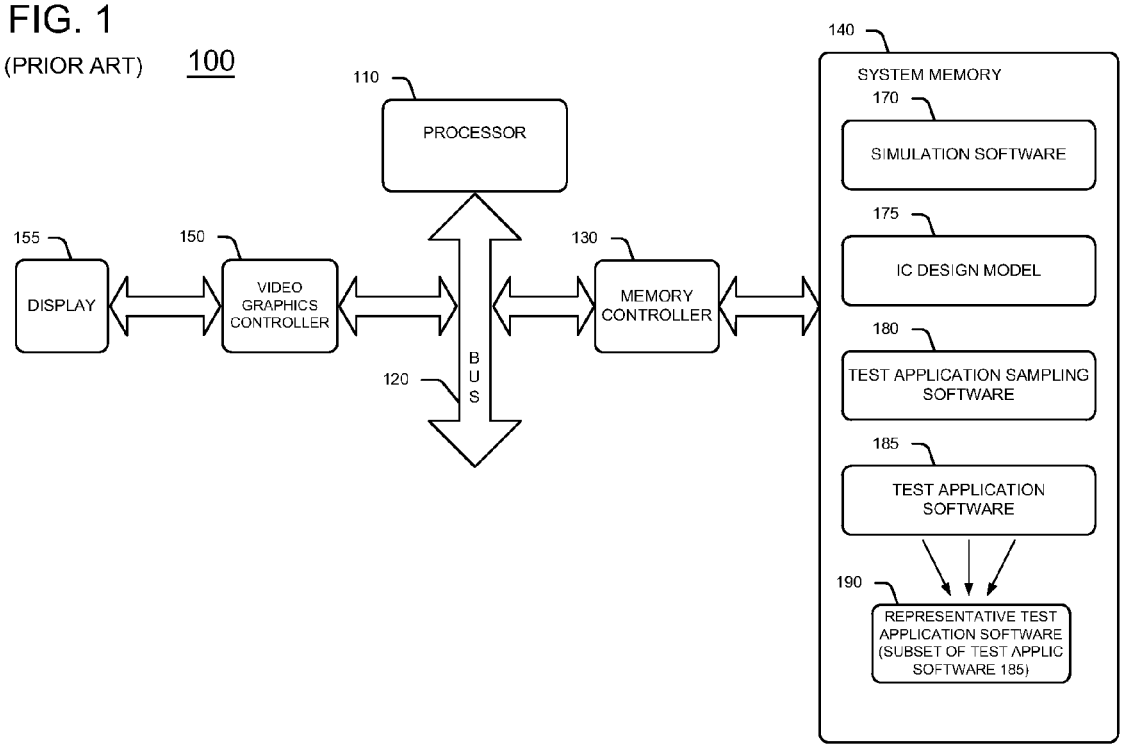
FIG. 1 is a block diagram of an information handling system that executes test application software on an IC design model.

FIG. 1 shows a conventional test system 100 that an IC designer may employ as a benchmarking tool for existing or new IC design analysis. Test system 100 includes a processor 110 that couples to a bus 120 to process information it receives via bus 120. A memory controller 130 couples a system memory 140 to bus 120. A video graphics controller 150 couples a display 155 to bus 120. System memory 140 includes simulation software 170 such as SPICE. IC designers may use SPICE or other simulation software to develop an analog and digital representation of the IC under development. System memory 140 includes such an IC design model 175. IC design model 175 represents a virtual model of the particular IC design under development, test, benchmarking, or other analysis. Designers may use simulation software 170 tools to develop IC design models for new designs or utilize previous IC design models from prior design development programs. IC design model 175 may be one output of simulation software 170.

Benchmark analysis of prior IC designs may be useful in estimating the design and performance characteristics of new designs. For example, designers may use the results of a simulation program to benchmark or estimate the performance of the design even prior to the implementation of the design in hardware. Due to the large amount of data associated with IC design development, performance evaluation tools typically employ sampling methodologies to reduce the total amount of data for evaluation. System memory 140 includes test application sampling software 180 such as "Simulation Points" (SimPoint), an open source test program promoted at the ASPLOS 2002 and ISCA 2003 conferences. SimPoint employs one such sampling methodology, namely trace or instruction sampling. System memory 140 also includes test application software 185.

Test application sampling software 180, such as SimPoint, monitors the addresses of each instruction of test application software 185 during execution or simulation of IC design model 175. Other software simulation tools, such as "Self Monitoring Analysis and Reporting Technology" (SMART) tool and Turbo SMART, identify program phase or code profile behavior in test application software programs 185 using instruction or trace sampling techniques. SimPoint, SMART, and Turbo SMART are examples of open source test application sampling software and, more particularly, tracer programs.

Test system 100 employs test application sampling software 180 and executes a workload, such as test application software 185, on IC design model 175. Test application software 185, such as SPEC2000, SPEC2006, TPC-C, etc, are common industry standard test programs for use by IC designers during development and evaluation of complex IC designs. Such standard test application software provides a baseline for comparison of benchmark performance results between broad types of IC design specifications. IC designers may use test application software, such as SPEC2006, to provide an analysis of the performance characteristics of a particular IC design prior to implementation of the IC design in hardware.

IC designers may compare the performance of one IC design to another. For example, IC designers may compare the performance of one generation of the PowerPC Processor IC to a next generation PowerPC Processor IC design. Another useful aspect of benchmark analysis is using the benchmark process to provide input for IC design during IC design trade-offs. IC design trade-offs, such as physical footprint, power consumption, noise immunity and many other trade-offs, consume many hours of design and development time. Benchmark analysis allows IC designers to make changes to the IC design model and compare prior results to new results before finalizing decisions relating to small or large IC design modifications.

IC designers may also use customer user application software as test application software 185. In this manner, test system 100 may simulate a real world application wherein the IC design model 175 executes actual user software application programs. This methodology provides IC designers and customers early access to performance characteristics versus performance expectations of future IC designs. In one example, test application sampling software 180 executes test application software 185 and collects a grouping of instructions or traces and develops groupings that depict different test application software program phases or code profile phases, such as memory read, memory writes, and numerical processing.

Test application sampling software 180 executes tracer programs such as SimPoint to develop a "Clock Per Instruction" (CPI) analysis of test application software 185. This CPI analysis provides a baseline or control to compare modifications such as in the IC design model 175 for future analysis. For example, it is common to develop a CPI analysis for a particular IC design model 175 when executing extensive test application software 185, such as SPEC2006. IC designers may then use this CPI analysis to compare to future benchmarking analysis of new IC designs.

A CPI analysis collects CPI information for the entire execution of test application software 185 on IC design model 175. Although this process may take considerable time to complete, IC designers typically only execute this process once per existing design. One very useful aspect of the CPI analysis is in comparing current results with the results of future smaller and representative test application software. For example, test application sampling software 180 such as SimPoint, may generate representative test application software 190. This offers the IC designers the opportunity to execute must faster benchmark analysis on IC designs without extensive time constraints. For example, an IC designer may execute the representative test application software 190 on the same IC design model 175 that executes the original test application software 185. Comparing the CPI analysis of the smaller representative test application software 190 with the CPI analysis of the much larger original test application software 185 may provide a good estimate of how close the smaller representative test application software 190 comes to approximating the much larger original test application software 185.

The IC designer may then use the representative test application software 190 on IC designs model changes and compare the results between IC designs. By using the representative test application software 190, the IC design evaluation time drops considerably. The IC designer may speed up the IC design process or test more design changes or do both. The CPI analysis provides another powerful feature, namely the identification of test application software program phases that may be useful by IC designers and others to analyze the performance of the IC design model under evaluation. Comparing one CPI analysis to another provides input into the method to generate an overall CPI error calculation for test application sampling software tools.

R-Metric (HPCA 1995), shows one method of measuring the representative strength of one test application software program 185 to another for benchmarking purposes of IC designs. For example, during execution of test application software program 185, test application sampling software 180 may monitor instruction execution representative metrics, such as branch prediction data, instruction execution context, and other metrics, per any given clock cycle. Moreover, during execution of test application software program 185, patterns such as program phases of a particular test application software program 185 may become identifiable to designers and software benchmarking tools.

Program phases of test application software 185 that execute within test application sampling software 180 may include numerical computations, repetitive graphical operations, processor disk load/store operations, register read/write operations or other operations. Designers and other entities may look for patterns in the CPI analysis that may reflect areas of similar program operation. Program phase analysis is an important tool that test application sampling software 180 and IC designers may employ to reduce overall application software program review by eliminating or combining similar program phases.

Instructions of a typical test application software program such as test application software 185 may be machine level assembly language instructions such as load, add, move, multiply, or other instructions. Conventional test system 100 may encounter a trillion or more instructions during execution of test application software 185. Test application sampling software 180 may organize the instructions of test application software 185 into basic blocks. Organizing the instructions of test application software 185 into such basic blocks allows test application sampling software 180 to reduce the magnitude or total size of the application software instruction data and to ultimately generate representative test application software 190.

Basic blocks represent unique instruction segments of the total instruction set that forms test application software 185. Basic blocks are segments or sections of program instructions from a larger test application software program, namely test application software 185, that start after a branch instruction and end with another branch instruction. A test application software program, such as test application software 185, contains up to trillions or more lines of code (LOC). Compilers generate compiled LOC that execute on a particular hardware platform. Test application software 185 contains the compiled LOC for use on the IC design model 175 platform. Basic blocks may repeat multiple times within test application software 185 after a particular compiler compiles a software programmer's higher level program language.

Figure 2:
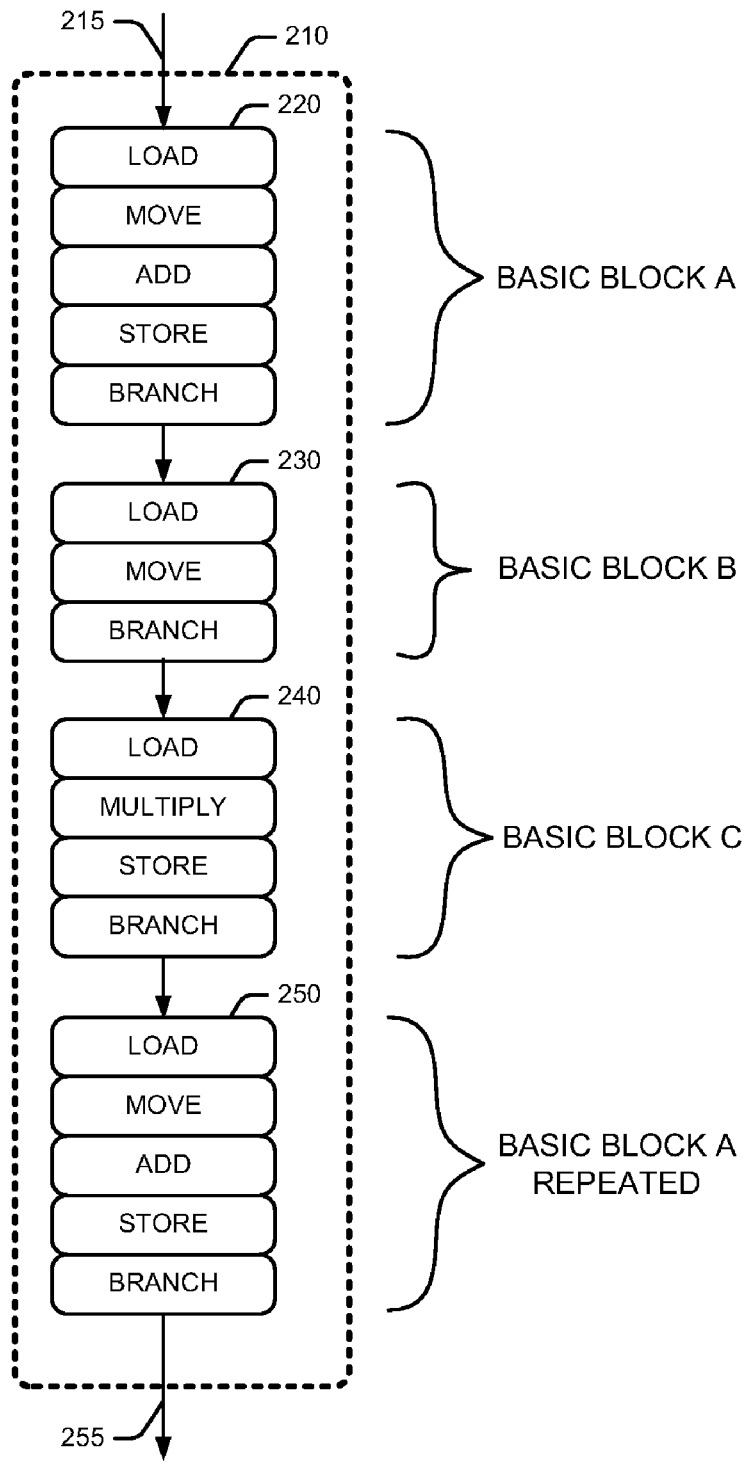
FIG. 2 depicts basic block identification from a particular segment of instructions of a larger test application software program.

FIG. 2 shows an instruction segment 210 of the much larger set of instructions or LOC of a test application software program, such as test application software 185. The down arrow 215 at the top of the instruction segment 210 represents a connection from a previous branch instruction of the much larger set of instructions of test application software 185. The first instruction at the top of a basic block A 220 is an assembly language or machine language load instruction, namely LOAD. Basic block A 220 includes the LOAD, MOVE, ADD, STORE and BRANCH instruction at the top of instruction segment 210.

As shown in FIG. 2, each basic block is a grouping, collection, or set of individual instructions within a larger instruction sequence. Basic blocks begin after a previous branch instruction. A basic block B 230 of instruction segment 210, follows basic block A 220 of the same instruction segment 210. Basic block B 230 includes the instructions, LOAD, MOVE, and ends with a BRANCH instruction. A basic block C 240 follows basic block B 230 of instruction segment 210. Basic block C 240 includes the instructions, LOAD, MULTIPLY, STORE and BRANCH instruction.

As with many test application software programs, test application software 185 includes a large amount of identical basic blocks. In the example of FIG. 2, one such identical basic block is a basic block A 250 that is identical to basic block A 220. Basic block A 250 follows basic block C 240 in the instruction set of instruction segment 210 and includes a LOAD, MOVE, ADD, STORE, and BRANCH instruction in sequence. After basic block A 250, as per the down arrow 255 at the bottom of instruction segment 210, instruction sequencing continues to the larger test application software 185 and further instruction segments and basic blocks not shown. Within test application software 185, basic block A 220 or other basic block may repeat due to software programmer input, compiler execution output, or other reason. The repetition of basic block A 220, as shown by basic block A 250, may provide an opportunity for test application sampling software 180 to reduce the total amount of instruction or trace calculations during the software simulation, benchmarking, or other analysis of IC design model 175. Repetition of multiple basic blocks in sequence may provide insight into repetitious execution program phases of test application sampling software 180, and opportunities for total instruction count reduction therein.

As stated above, test application software programs are typically very large, often including more than a trillion individual instructions or LOC. Basic blocks, such as the basic blocks of FIG. 2, provide input into one methodology to reduce the total amount of information, such as instruction counts for software simulation, benchmark, and performance tools. For example, since basic blocks repeat multiple times within a typical test application software program, test application sampling software 180 may treat basic blocks as the primary unit of measure during execution of test application software 185 and further analysis of IC design model 175. In other words, test application sampling software 180 may collect the execution count or number of times that common basic blocks, such as basic block A, execute during the execution of test application software 185 with IC design model 175. A basic block vector (BBV) is a vector, such as a data structure of execution counts that represents the number of times that a particular basic block repeats during testing of test application software 185. Each unique basic block that application software 185 executes corresponds to a unique location and provides input into the formation of each basic block vector (BBV).

One known method for generating BBVs involves executing a test application software program, such as test application software 185, in a virtual environment that test system 100 with its IC design model 175 provides. Test application software 185 has a specific size or LOC count that describes the program size. More specifically, the compiled code of test application software 185, includes a start and a finish. Test application sampling software 180 executes test application software 185 from start to finish. An IC designer or other entity tests the virtual design of an IC or semiconductor die design per IC design model 175 by executing test application sampling software 180 with test application software 185 in test system 100. The IC designer or other entity performs this test with IC design model 175 loaded in system memory 140.

Test application sampling software 180 uses BBV analysis to reduce the total size of test application software 185 and generate reduced or representative test application software 190 therefrom. Representative test application software 190 is a subset of, and thus smaller than, test application software 185. Since representative test application software 190 is smaller than test application software 185, representative test application software 190 executes faster than test application software 185 in the virtual test environment of conventional test system 100. The test application sampling software 180 may generate output data to demonstrate the design performance characteristics of the virtual IC design model 175 using the representative test application software 190. Designers may interpret the results of the test application sampling software 180 to determine if design guidelines are met, or if redesign efforts in hardware, software, or other design areas are needed.

In one embodiment, test application sampling software 180 executes test application software 185 on a virtual design model, namely IC design model 175, that test system 100 loads in system memory 140. Test application software 185 may be special test software for execution and demonstration of particular areas of IC design model 175. Test application software 185 may be user software that end customers plan on using on a real product or production model of IC design model 175. In either case, the test application sampling software 180 generates real world results corresponding to the instructions that execute therein.

In one example, the test application sampling software 180 evaluates each 10 million instructions during execution of test application software 185 at a time until either the test application software program ends, or until the test application sampling software reaches a particular BBV count. Each 10 million instructions represents one example of an instruction interval that designers may assign as the primary instruction count size to evaluate during execution of test application software 185. An instruction interval is a size in LOC and not a period of time of execution of test application software 185. Test application sampling software 180 executes and evaluates the first instruction interval of 10 million instructions of test application software 185 and keeps track of each unique basic block that it encounters during execution. In one embodiment, test system 100 is a multi-processing system. In that case, the first 10 million instructions that test application sampling software 180 executes may be in a different order than the original lines of code (LOC) of test application software 185.

FIG. 3 shows one example of a conventional BBV format 300 that test application sampling software, such as test application sampling software 180, may generate. A basic block vector BBV1 310 includes the results of the first instruction interval of 10 million instructions that execute of test application software 185 executing on IC design model 175. Each cell of BBV1 310 in the top row of data includes a respective basic block identifier, namely basic block identifiers for basic block BB1-0 to BB1-47. Below each basic block identifier is the bottom row of data including the respective execution count or number of repetitions of each basic block when the application software 185 executes on a test system or simulator 100. For example, BBV1 310 includes column 310-0 that describes basic block BB1-0 and its respective execution count of 80. In other words, in this example the first basic block of BBV1 310, namely BB1-0 executes 80 times within the first instruction interval of 10 million execution instructions of test application sampling software 180.

The next unique basic block that the test application sampling software 180 executes in the first instruction interval of 10 million instructions is basic block BB1-1 that executes 200 times during the first 10 million instructions of execution of test application software 185, as shown in column 310-1. Column 310-2 shows basic block BB1-2 and a respective execution count of 400, and so forth until basic block BB1-47 executes 500 times as shown in column 310-47. In this example, test application sampling software 180 identifies a total count of 48 unique basic blocks, namely BB1-0 310-0 through BB1-47 310-47. Basic block vector BBV1 310 is complete or full of data when the test application sampling software 180 executes the entirety of the first instruction interval or 10 million instructions of test application software 185. Each entry in the data fields of the bottom row of BBV1 310 represents the number of executions of a respective basic block immediately above. The basic block vector BBV is significantly smaller than the 10 million instructions that test application sampling software 180 uses to create it. The BBV offers a dramatic reduction opportunity in data for evaluation of application software and hardware performance on a particular IC design model without dramatically reducing the significance or value of that data to the IC design benchmarking process. IC designers may use statistical analysis of BBV information to cluster or identify groups of similar BBVs that represent instruction interval data. In one reduction example, a single BBV may represent an entire clustering of BBVs as described in more detail below.

In one example, basic blocks BB1-0 through BB1-47 of BBV1 310 represent the entire unique set of basic blocks that test application sampling software 180 executes. In that case, basic blocks BB1-0, BB2-0, and BBN-0 of BBV1 310, BBV2 320 and BBVN 330 respectively are identical basic blocks and test application software 185 includes a total of 48 unique basic blocks. BB1-1, BB2-1 and BBN-1 are identical basic blocks. BB1-2, BB2-2, and BBN-2 are also identical basic blocks. Finally as shown in FIG. 3 BB1-47, BB2-47, and BBN-X are the same basic blocks. In other words, each BBV, such as BBV1 310, BBV2 320 and BBVN 330 provides specific execution counts for the same set of basic blocks, namely 48 unique basic blocks. Test application sampling software 180 executes the next instruction interval or set of 10 million instructions of application software to generate the next basic block vector, namely a BBV2 320. Each cell of BBV2 320 in the top row of data includes a respective basic block identifier, namely basic block identifiers for basic blocks BB2-0 to BB2-47, of 48 unique basic blocks. Below each basic block identifier is a respective execution count or number of repetitions of the corresponding basic block. These execution counts or repetitions form the bottom row of data of basic block vector BBV2 320. BBV2 320 includes column 320-0 that shows basic block BB2-0 and a respective execution count of 100. In other words, in this example, the first basic block that the test application sampling software 180 encounters in the second set of 10 million instructions of test application software 185 is basic block BB2-0 that executes 100 times.

The next unique basic block that test application sampling software 180 encounters is BB2-1 that executes 300 times during the second 10 million instructions of application software execution as shown in column 320-1. Column 320-2 shows basic block BB2-2 and an execution count of 200, and so forth until, basic block BB2-47 executes 400 times as seen per column 320-47. Basic block vector BBV2 320 is complete or full of data when the test application sampling software 180 executes the entirety of the second 10 million instructions of test application software 185. Each entry in the data fields of the bottom row of basic block vector BBV2 320 represents the execution of a particular basic block. In the case of BBV2 320, the total number of basic blocks remains the same as BBV1 310, namely 48 unique basic blocks. However, the basic block execution counts, as seen in the bottom row of each BBV, namely BBV1 310 through BBVN 330, differ because of the non-repetitive nature of application software instructions, such as test application software 185. Any 10 million application software instructions are likely to have a unique set of total basic block execution counts.

As the test application sampling software 180 generates BBVs, each BBV becomes a unique set of data that is useful for understanding application software flow. BBVs take on a data form that closely relates to the program phase that the test application software 185 executes during their formation. For example, BBV1 310 may represent a memory read/write operation and provides a higher level structure than the detailed instructions that provide the input therefor. BBV1 310 includes much less data than the 10 million instructions that test application sampling software 180 evaluated during construction of BBV1 310. By grouping similar BBVs, test application sampling software 180 may further reduce the total amount of data that designers use to evaluate the performance of a particular IC design model.

Test application sampling software 180 continues execution with the next set of 10 million instructions populating a BBV3, BBV4, etc. (not shown), until finally generating a basic block vector BBVN 330, wherein N is the total number of basic block vectors. In other words, BBVN 330 is the last in the series of BBVs that the test application sampling software 180 generates during execution of test application software 185. BBN-0, BBN-1, BBN-2, and so on, including BBN-X represent the basic blocks that the test application sampling software 180 generates during the final 10 million count of instructions of the test application software 185. In this example, X is 48, and is the total number of unique basic blocks in BBVN 330.

BBVN 330 populates in the same fashion as BBV1 310 and BBV2 320 as described above. BBVN 330 is the final BBV that test application sampling software 180 generates because the test application software 185 completes or designers select a maximum BBV count. Typical application software 185 may generate hundreds of BBVs. The BBV count may vary due to the application software program size, sampling interval size, BBV format, and other parameters. Although the example of FIG. 3 utilizes a BBV generation size or instruction interval of 10 million instructions, and a BBV basic block count of 48, test application sampling software 180, simulation tools, designers, and other entities may select any other particular numerical counting method.

BBVs are a representative sample of the test application software 185 that executes on a virtual IC design model. Test application sampling software 180 executes a clustering tool program such as SimPoint or other clustering tool that may use the BBV data to establish clusters of similar BBVs, and thus clusters or cluster groups of similar instruction intervals. Conventional test application benchmark and sampling tool software may choose the most representative instruction interval in a cluster group to represent the entire cluster group. This conventional test application and sampling tool software, such as test application sampling software 180 offers a reduction in overall data for other software tools to use in the aid of IC design development, and provides for much faster IC design analysis than other detailed transistor and component level simulation.

One limitation of conventional test application sampling software 180, such as SimPoint software, and BBV generation as shown above in FIG. 3, is that conventional test application sampling software captures the "program phase" changes due to changes in program control flow. A program phase represents a particular sequence of basic blocks relating to hardware and software operation. Conventional test application sampling software 180 may not capture program phase changes that occur as the result of changes in microarchitecture dependent events. One such capture weakness is the case wherein particular data dependencies do not change the control flow directly, but rather the instruction or data cache miss rates of the program. Those particular data dependencies may differ for the unique microarchitecture elements of IC design model 175 under evaluation. Such microarchitecture dependent characteristics may be lost in the format described above in BBV format 300 of FIG. 3.

Microarchitecture dependent information may include data cache misses, branch mis-predictions, or any other event that causes a CPI error due to microarchitecture dependent information. In one embodiment of the disclosed testing methodology, particular test application sampling software 404, described below with reference to FIG. 4, may collect microarchitecture dependent information "on-the-fly" or in real time operation of a test application software program 485. The particular test application sampling software may collect this information "on-the-fly" and create a database with this real-time or fly-by information. The particular test application sampling software 404 may store the data dependent fly-by information in a special vector called a fly-by vector (FBV). The FBV is a collection of microarchitecture dependent information that test application sampling software 404 generates during each instruction interval execution of test application software program 485. The FBV format is described in more detail below.

Figure 4:
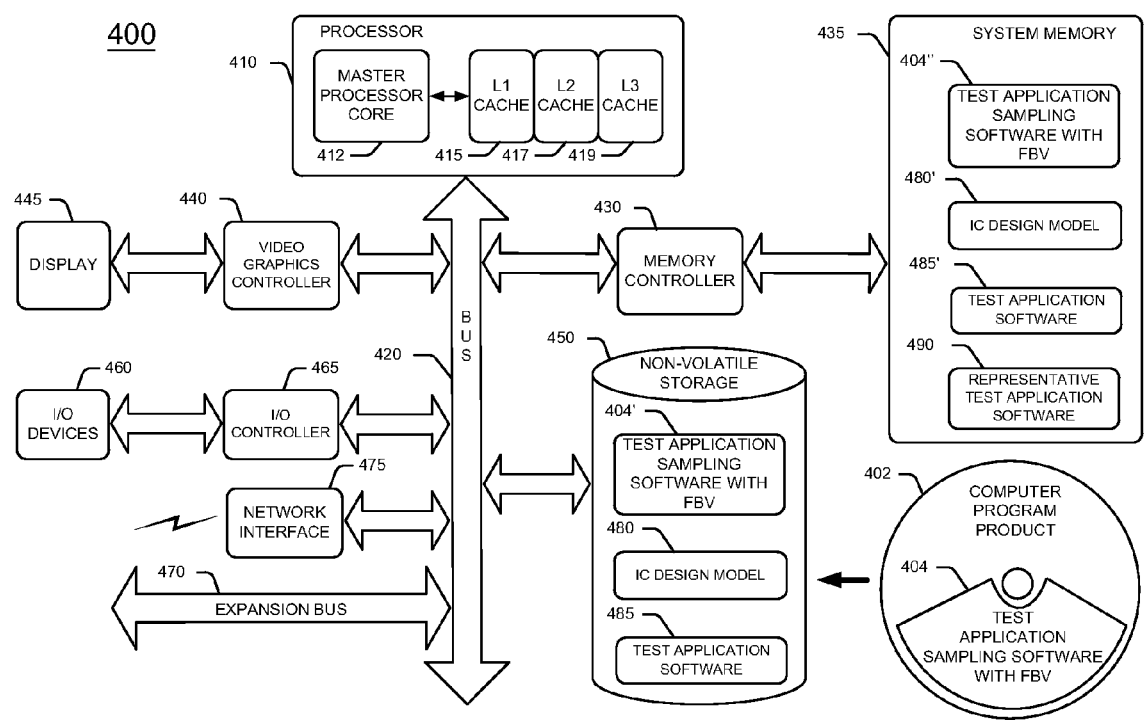
FIG. 4 is a block diagram of an information handling system that executes test application sampling software with fly-by vector (FBV) analysis and test application software on an IC design model.

FIG. 4 shows one embodiment of the disclosed test system 400 that an IC designer may employ as an IC design simulation and benchmarking tool. Test system 400 includes a computer program product 402, such as a media disk, media drive or other media storage. Test system 400 also includes test application sampling software with FBV 404 that enables IC designers to perform benchmarking of IC designs. Test application sampling software with FBV 404 may include multiple programs such as tracer or other programs for monitoring information about a particular test application software program's execution. Test application sampling software with FBV 404 includes FBV generation and analysis programs. Test application sampling software with FBV 404 may include instruction and basic block clustering programs or other programs to support IC design analysis, development and performance modeling. In contrast with other test systems that simply employ BBVs, the disclosed test system 400 employs FBVs that include microarchitecture dependent information as explained in more detail below. In test system 400, other terms for test application sampling software with FBV 404 are test application sampling software with FBV feature and test application sampling software with FBV.

Test system 400 includes a processor 410 that includes a master processor core 412. Master processor core 412 couples to an L1 cache 415, an L2 cache 417, and an L3 cache 419. Processor 410 couples to a bus 420. A memory controller 430 couples a system memory 435 to bus 420. A video graphics controller 440 couples a display 445 to bus 420. Test system 400 includes nonvolatile storage 450, such as a hard disk drive, CD drive, DVD drive, or other nonvolatile storage that couples to bus 420 to provide test system 400 with permanent storage of information. System memory 435 and nonvolatile storage 450 are each a form of data store. I/O devices 460, such as a keyboard and a mouse pointing device, couple via an I/O controller 465 to bus 420.

One or more expansion busses 470, such as USB, IEEE 1394 bus, ATA, SATA, PCI, PCIE and other busses, couple to bus 420 to facilitate the connection of peripherals and devices to test system 400. A network interface 475 couples to bus 420 to enable test system 400 to connect by wire or wirelessly to other network devices. Test system 400 may take many forms. For example, test system 400 may take the form of a desktop, server, portable, laptop, notebook, or other form factor computer or data processing system. Test system 400 may also take other form factors such as a personal digital assistant (PDA), a gaming device, a portable telephone device, a communication device or other devices that include a processor and memory.

Test system 400 may employ a compact disk (CD), digital versatile disk (DVD), floppy disk, external hard disk or virtually any other digital storage medium as medium 402. Medium 402 stores software including test application sampling software with FBV 404 thereon. A user or other entity installs software such as test application sampling software with FBV 404 on test system 400 prior to conducting testing with the test application sampling software with FBV 404. The designation, test application sampling software with FBV 404', describes test application sampling software with FBV 404 after installation in non-volatile storage 450 of test system 400. The designation, test application sampling software with FBV 404", describes test application sampling software with FBV 404 after test system 400 loads the test application sampling software with FBV 404 into system memory 435 for execution.

An IC design model 480 is a database of timing and other characteristics of a virtual IC design or virtual semiconductor die design for use by test application sampling software with FBV 404. A workload or test application software 485 is a program or set of instructions for use by test application sampling software with FBV 404 to simulate the execution of benchmarking, user or other test application software on an IC model such as IC design model 480. Test application sampling software with FBV 404 is a software simulation and benchmarking tool. Test application sampling software with FBV 404 may include a software simulation tool program, such as SimPoint, or other software simulation program to provide instruction trace analysis in test system 400. Test system 400 executes test application sampling software with FBV 404 to evaluate IC design characteristics of IC design model 480 for performance and other analysis.

IC design model 480 loads on non-volatile storage 450 from another test system or other entity prior to execution of test application sampling software with FBV 404. In a similar fashion, test application software 485 loads on non-volatile storage 450 from another test system or other entity prior to execution of test application sampling software with FBV 404. The designation, IC design model 480', describes the IC design model 480 after test system 400 loads the IC design model 480 and test application sampling software with FBV 404 into system memory 435 for execution. Similarly, the designation, test application software 485', describes the test application software 485 after test system 400 loads the test application software 485 into system memory 435 for execution on the IC design model 480'.

Test application sampling software with FBV 404 generates a representative workload, such as representative test application software 490 during execution and evaluation of test application software 485. In one example of the disclosed methodology, test application sampling software with FBV 404 reduces the total LOC count of test application software 485 into a smaller representative version of that test application software, namely representative test application software 490. Representative test application software 490 is a representative subset of test application software 485. The representative test application software 490 may store in system memory 435 for execution within test system 400. Test application sampling software with FBV 404" may execute and evaluate the performance characteristics of representative test application software 490 on an IC design model such as IC design model 480.

In one embodiment, test application sampling software with FBV 404 implements the disclosed methodology as a set of instructions (program code) in a code module which may, for example, reside in the system memory 435 of test system 400 of FIG. 4. Until test system 400 requires this set of instructions, another memory, for example, non-volatile storage 450 such as a hard disk drive, or a removable memory such as an optical disk or floppy disk, may store this set of instructions. Test system 400 may also download this set of instructions via the Internet or other computer network. Thus, a computer program product may implement the disclosed methodology for use in a computer such as test system 400. In such a software embodiment, RAM or system memory 435 may store code that carries out the functions described in the flowchart of FIG. 7 while processor 410 executes such code. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Figure 5A:
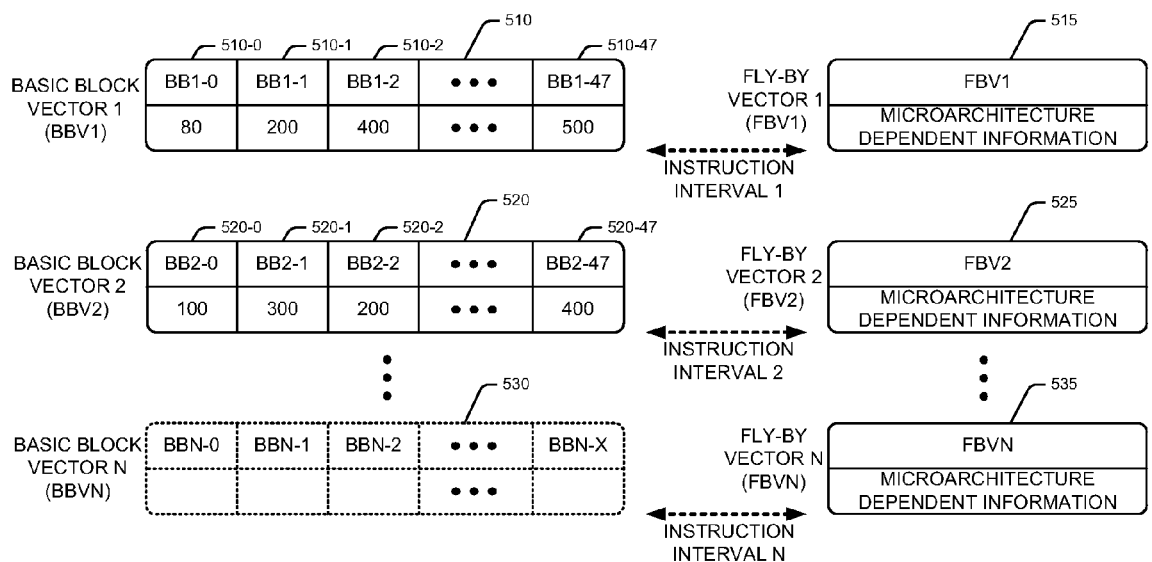
FIG. 5A is a representation of a basic block vector (BBV) format with corresponding independent fly-by vector format that the disclosed methodology generates.

FIG. 5A depicts a fly-by vector format, namely FBV format 500 that shows the independent FBV component corresponding to each BBV. Each BBV representative of an instruction interval of 10 million instructions of test application software 485 has a corresponding FBV. For example, a BBV1 510 representing the first 10 million instructions, or first instruction interval of test application software 485, has a corresponding FBV1 515. Stated alternatively, during execution and analysis of test application software 485, test application sampling software with FBV 404 generates both BBV1 510 and FBV1 515 independently. As shown by the arrow between BBV1 510 and FBV1 515, both vectors have instruction interval 1 in common. The association of both BBV1 510 and a respective FBV1 515 that test application sampling software with FBV generates from the same instruction interval demonstrates the arrangement of the FBV format 500. The instruction interval value of 10 million instructions is for purpose of example. In actual practice, the instruction interval may have a predetermined value greater than or less than 10 million instructions depending on the particular application and the amount of testing time available.

FBV1 515 may contain one or more dimensional information that includes microarchitecture dependent information of test application software 485 executing on IC design model 480. For example, FBV1 515 may contain the cache miss data count for L1 cache 415 during the first instruction interval of test application software 485. In another embodiment, FBV1 515 may contain information such as data cache miss counts for L1 cache 415, L2 cache 417, and L3 cache 419 in a numerical relationship. In other embodiments of the disclosed methodology, FBV1 515 may contain any combination of types of microarchitecture dependent information such as cache miss count, branch misprediction counts, CPI error calculations, and other microarchitecture dependent information that test application sampling software with FBV 404 generates during execution on a per instruction interval basis.

Fly-by vector format 500 of FIG. 5A includes some structures in common with conventional basic block vector format 300 of FIG. 3. For example, test application sampling software with FBV 404 may generate BBV1 510 in a similar fashion to generation of BBV1 310 of FIG. 3. However, format 500 contains microarchitecture dependent information in a fly-by vector (FBV) format that conventional vector format 300 does not. As seen in FIG. 5A, FBV1 contains microarchitecture dependent information that test application sampling software with FBV 404 generates. In particular, test application sampling software with FBV 404 generates FBV1 515 from the first 10 million instructions, or first instruction interval, namely instruction interval 1, of test application software 485. In one embodiment, test application sampling software with FBV 404 generates fly-by vector 1 (FBV1) concurrently with executing the 10 million instructions of instruction interval 1.

A basic block vector BBV1 510 includes the results of the first 10 million instructions that execute of test application software 485 executing on IC design model 480. Each cell of BBV1 510 in the top row of data includes a respective basic block identifier, namely basic block identifiers for basic block BB1-0 to BB1-47. Below each basic block identifier is the bottom row of data including the respective execution count or number of repetitions of each basic block when the application software executes on a test system 400 or simulator. For example, BBV1 510 includes column 510-0 that describes basic block BB1-0 and its respective execution count of 80. In other words, in this example the first basic block that the test application sampling software 180 encounters in the application software is BB1-0, and basic block BB1-0 executes 80 times within the first 10 million execution instructions, namely instruction interval 1.

The next unique basic block that the test application sampling software with FBV 404 encounters in the first 10 million instructions of instruction interval 1 is basic block BB1-1 that executes 200 times during the first 10 million instructions of execution of test application software 485, as shown in column 510-1. Column 510-2 shows basic block BB1-2 and a respective execution count of 400, and so forth until basic block BB1-47 executes 500 times as shown in column 510-47. In this embodiment, test application sampling software with FBV 404 identifies a total count of 48 unique basic blocks, namely BB1-0 510-0 through BB1-47 510-47. Basic block vector BBV1 510 is complete or full of data when the test application sampling software with FBV 404 executes the entirety of the first 10 million instructions in instruction interval 1 of test application software 485. Each entry in the data fields of the bottom row of BBV1 510 represents the number of executions of a respective basic block immediately above.

Microarchitecture dependent information may include data dependent information relating to data cache misses, branch mispredictions, or other events that cause a CPI error. Microarchitecture dependent information may be any information that test application sampling software with FBV 404 collects that indicates an effect from data on the instruction execution of application software, such as test application software 485. For example, a cache miss may potentially stall or delay the execution of test application software 485 during test application sampling software with FBV 404 execution and analysis. Test application sampling software with FBV 404 may capture or collect information such as clock cycle delays that this potential stall or delay of test application software 485 incurs. In one embodiment, the clock cycle delays of a cache miss provide the microarchitecture dependent information for analysis by test application sampling software with FBV 404.

After completing execution of the 10 million instructions of instruction interval 1, test application sampling software with FBV 404 executes the next set of 10 million instructions of test application software 485, namely instruction interval 2, to generate the next basic block vector, and fly-by vector, namely a BBV2 520 and FBV2 525 respectively. Each cell of BBV2 520 in the top row of data includes a respective basic block identifier, namely basic block identifiers for basic blocks BB2-0 to BB2-47. Basic blocks BB2-0 to BB2-47 are 48 unique basic blocks. Below each basic block identifier is a respective execution count or number of repetitions of the corresponding basic block. These execution counts or repetitions form the bottom row of data of basic block vector BBV2 520. BBV2 520 includes column 520-0 that shows basic block BB2-0 and a respective execution count of 100. In other words, in this example, the first basic block that the test application sampling software with FBV 404 encounters in the 10 million instructions of instruction interval 2 of test application software 485 is basic block BB2-0 that executes 100 times. During generation of BBV2 520, test application sampling software with FBV 404 generates FBV2 525 that corresponds to the analysis of microarchitecture dependent information of the 10 million instructions of instruction interval 2 of test application software 485.

The next unique basic block that test application sampling software with FBV 404 encounters is BB2-1 that executes 300 times during the 10 million instructions of instruction interval 2 of application software execution, as shown in column 520-1. Column 520-2 shows basic block BB2-2 and an execution count of 200, and so forth until, basic block BB2-47 executes 400 times as seen per column 520-47. Basic block vector BBV2 520 is complete or full of data when the test application sampling software with FBV 404 executes the entirety of the 10 million instructions of instruction interval 2 of test application software 485. Each entry in the data fields of the bottom row of basic block vector BBV2 520 represents the execution of a particular basic block.

In the case of BBV2 520, the total number of basic blocks remains the same as BBV1 510, namely 48 unique basic blocks. However, the basic block execution counts, as seen in the bottom row of each BBV, namely BBV1 510 through BBVN 530, differ because of the non repetitive nature of application software instructions, such as test application software 485. Any 10 million application software instructions are likely to have a unique set of total basic block execution counts. Microarchitecture dependent information is likely to change from FBV1 to FBV2, and so on, since microarchitecture dependent information relies heavily on program execution of test application software 485 which may be very unpredictable from one fly-by vector to another. In one embodiment, FBV2 525 includes microarchitecture dependent information that test application sampling software with FBV 404 generates from miss rate data that L1 cache 115, L2 cache 117, and L3 cache 119 may supply.

As the test application sampling software with FBV 404 generates BBVs, each becomes a unique set of data that is useful for understanding data independent application software flow. BBVs take on a data form that closely relates to the instruction address flow, and thus the program phases or code profile phases that the test application software 485 executes during their formation. For example, BBV1 510 may represent a memory read/write operation and provides a higher level structure than the detailed instructions that provide the input for test application sampling software with FBV 404. BBV1 510 includes much less data than the 10 million instructions that test application sampling software with FBV 404 evaluated during construction of BBV1 510. By grouping similar BBVs, test application sampling software with FBV 404 may further reduce the total amount of data that designers use to evaluate the performance of a particular IC design model 480.

Alternatively, as the test application sampling software with FBV 404 generates FBVs, each FBV becomes a unique set of data that is useful for understanding microarchitecture dependent application software flow. FBVs take on a data form that closely relates to microarchitecture dependent instruction flow, and thus program phases that the test application software 485 executes during their formation. For example, FBV1 515 may represent a memory read/write operation wherein data cache misses are extremely high, and thus provides a higher level structure than the detailed instructions that provide the input therein. Test application sampling software with FBV 404 may use the microarchitecture dependent information of FBV1 515 to enhance the respective data independent information already available from the corresponding BBV1 510 data.

Test application sampling software with FBV 404 continues with the next set of 10 million instructions populating a BBV3, BBV4, etc. (not shown), until finally generating a basic block vector BBVN 530, wherein N is the total number of basic block vectors. Test application sampling software with FBV 404 also continues populating FBV3, FBV4, etc. (not shown), until finally generating a fly-by vector FBVN, wherein N is the total number of fly-by vectors. In other words, BBVN 530 and its respective FBVN 535 are the last in the series of vectors that the test application sampling software with FBV 404 generates during execution of the last instruction interval of 10 million instructions of test application software 485. BBN-0, BBN-1, BBN-2 . . . BBN-X represent the basic blocks that the test application sampling software with FBV 404 identifies for the last instruction interval of 10 million count of instructions of test application software 485. Test application sampling software with FBV 404, executing the final 10 million instruction count, generates BBN-X wherein X is 48, and the total number of unique basic blocks in BBVN 530 for this embodiment. The basic block count X may vary due to the test application software program instructions, user input, and other parameters.

BBVN 530 and the respective FBVN 535 populate fly-by format 500 in the same manner that BBV1 510 and FBV2 515 populate fly-by format 500 as described above. BBVN 530 and FBV 535 are the final BBV and respective FBV that the test application sampling software with FBV 404 generates because the application software completes or designers select a maximum N count. Test application sampling software with FBV 404 may generate hundreds of BBVs and corresponding respective FBVs. The BBV and FBV count may vary due to the test application software program size, sampling instruction interval size, program run times, and other parameters.

FIG. 5B shows FBV examples 540 for FBV1 of FIG. 5A above, including microarchitecture dependent information from instruction interval 1 by a generation methodology using test application sampling software with FBV 404. In one embodiment, test application sampling software with FBV 404 generates the FBV examples of FIG. 5B during execution of test application software 485 on IC design model 480. FBV1 515 may include L1 cache 415 misses microarchitecture dependent information, namely FBV1-1 550. FBV1-1 550 is one example of FBV1 515 wherein the microarchitecture dependent information that test application sampling software with FBV 404 generates during execution of the first instruction interval of test application software 485 is a count of 25. In other words, during the execution of instruction interval 1, test application software 485 encounters 25 L1 cache 415 misses. In this example, FBV1-1 550 replaces FBV1 515 and corresponds to instruction interval 1 and BBV1 510 as seen in the example of FIG. 5A above.

In another embodiment of the generation of FBV1 515, FBV1-2 555 depicts a fly-by vector that includes microarchitecture dependent information such as L1 cache 415 misses and branch mispredict counts. During the execution of instruction interval 1, test application software 485 encounters 25 L1 cache 415 misses and 40 branch mispredict events. Test application sampling software with FBV 404 captures this microarchitecture dependent information in fly-by vector FBV1-2 555. Another example of FBV1 515, namely FBV1-3 560, includes three microarchitecture dependent information data elements. FBV1-3 560 includes data for L1 cache 415 misses, L2 cache 417 misses, and L3 cache 419 misses. In other words, during instruction interval 1, test application software 485 encounters 25 L1 cache 415 misses, 10 L2 cache 417 misses, and 4 L3 cache 419 misses. Although the examples of FIG. 5B demonstrate particular types of microarchitecture dependent information, test application sampling software with FBV 404, simulation tools, designers, and other entities may select any other particular microarchitecture dependent information and corresponding FBV format.

Figure 6:
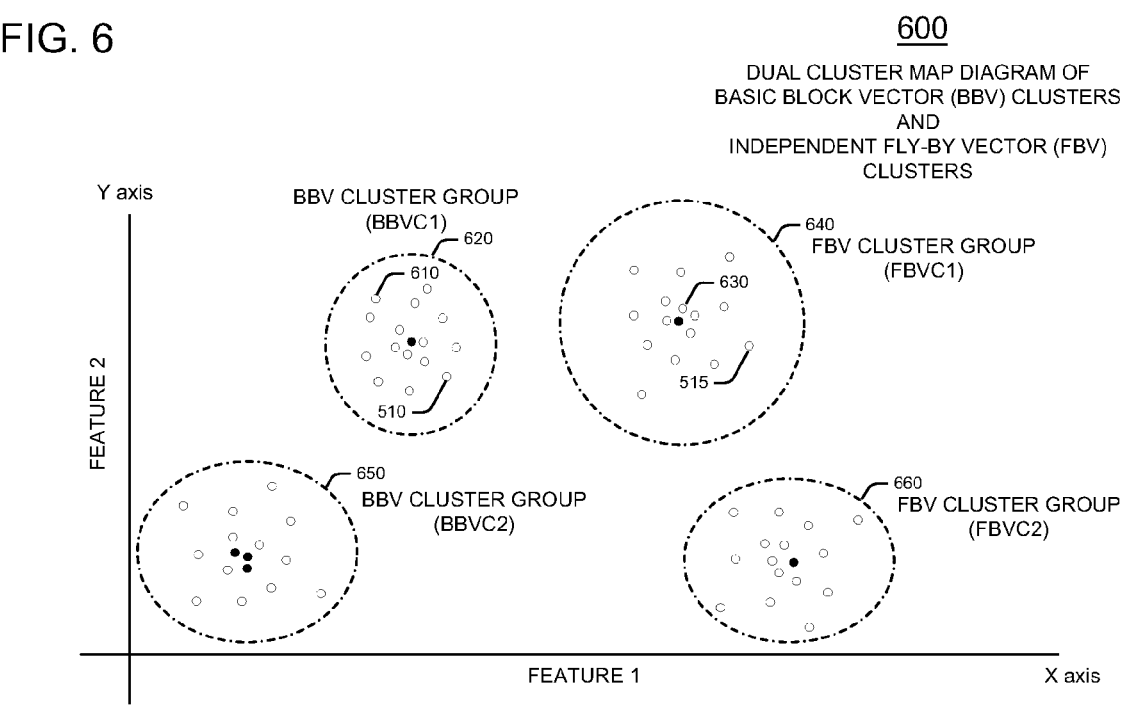
FIG. 6 is a dual cluster map diagram depicting cluster data points and cluster groups from the mapping of basic block vectors and fly-by vectors.

FIG. 6 shows a dual cluster map diagram 600 that depicts one methodology for grouping basic block vectors (BBVs) and fly-by vectors (FBVs). Dual cluster map diagram 600 is a visual representation of one method that test application sampling software with FBV 404 clusters or groups instruction interval data, such as BBVs and FBVs during execution and analysis of test application software 485. Diagram 600 is a dual cluster diagram map because it shows both basic block vectors (BBVs) and corresponding respective fly-by vectors (FBVs). Each cluster data point, as seen by a small circle such as circle 610 on the dual cluster map diagram, denotes one BBV of the collection of vectors that test application sampling software with FBV 404 generates during the execution and analysis of test application software 485. Stated alternatively, each cluster data point, such as circle 610 represents one instruction interval, such as 10 million instructions that test application sampling software with FBV 404 executes and analyzes.

Each vector, such as the BBV and FBV vectors, corresponds to one sampling instruction interval, such as 10 million instructions, of the basic block analysis of IC design model 480. For example, in FIG. 6, BBV1 510 may represent one unique cluster data point on dual cluster map diagram 600. In this example, a cluster group, such as BBV cluster BBVC1 620, contains a grouping of BBVs. A cluster data point, as seen by a small circle such as circle 630, on the dual cluster map diagram 600, denotes one FBV of the collection of FBVs that test application sampling software with FBV 404 generates during the execution and analysis of test application software 485. In this example, an FBV cluster FBVC1 640 contains a grouping of FBVs. In this example, an FBV, such as FBV1 515 is shown as one of multiple FBV cluster data points of FBV cluster FBVC1 640.

By properly choosing the X axis and Y axis parameters, BBVs may group or cluster together in relationships that directly link to program phases that occur during the execution of test application software 485. In a similar manner, another X axis and Y axis parameter for FBVs may group or cluster together in relationships that directly link to microarchitecture dependent parameters such as cache miss rates, branch mispredictions, etc. that occur during the execution of test application software 485. The X axis and Y axis parameters are chosen independently for BBV and FBV groupings. Stated alternatively, the BBV cluster groups and FBV cluster groups do not directly align or link with each other; rather the BBV and FBV cluster groups are independent.

In this example, test application sampling software with FBV 404 generates BBV1 510 and a respective FBV1 515 during execution of the same instruction interval of test application software 485. However, during cluster grouping, test application sampling software with FBV 404 groups BBV1 510 and FBV1 515 independently. As seen in the example of FIG. 6, multiple cluster groups may form during the execution of test application software 485. For example, cluster group BBVC2 650 may represent another of multiple cluster groups, such as the BBV cluster groups. A cluster group FBVC2 660 may represent another FBV cluster group of multiple FBV cluster groups. The total number of cluster groups, such as BBV cluster groups and FBV cluster groups, may depend on the length of test application software 485, as well as other factors.

In FIG. 6, feature 1 and feature 2 respectively represent the X and Y axis parameters of the cluster map diagram 600 that test application sampling software with FBV 404 may generate. The feature 1 and feature 2 parameters provide feature selection or sorting of BBVs and FBVs by workload characterization graphing. Workload characterization graphing provides a method of performance modeling by program phase of IC design model 480 while executing test application software 485. One such workload characterization method is the K-Means clustering analysis method, developed at the University of Berkeley, utilizing Manhattan Distance cluster data point calculations. Manhattan Distance measurement provides for analysis of cluster data points by calculating the sum of the absolute difference of each of their coordinates from one another. In other words, the distance between two cluster data points is the sum of the orthogonal coordinate distance between the points.

K-Means clustering provides a method of grouping or partitioning a large data set into subsets or clusters such that the data in each subset share a common set of traits. K-Means clustering may provide this method for grouping the BBV and FBV results of the execution of test application software 485 by test application sampling software with FBV 404. For example, BBV cluster group BBVC1 620 is a grouping of particular BBVs that may represent the operational program phase for processing a graphical object transformation on a graphics display, such as display 445. In this example, the common trait is graphical object processing instructions or basic blocks of those particular BBVs. A cluster group BBVC2 650 may represent a cluster or group of different particular BBVs that corresponds to instructions that further execute read and write operations to memory, such as system memory 435. In this example, the common trait is "read and write" instructions or basic blocks of the different particular BBVs.

The K-Means clustering method provides a similar grouping or partitioning methodology for large FBV data sets into subsets or clusters such that the data in each subset share a common set of traits. K-Means clustering may provide this method for grouping the FBV results of the execution of test application software 485 by test application sampling software with FBV 404. For example, FBV cluster group FBVC1 640 is a cluster group that may represent a grouping of particular FBVs that have data cache miss rate information as their common trait. In this example, the common trait is instructions or basic blocks that have data cache miss rate information in common during execution of test application software 485. A cluster group FBVC2 660 may represent any other particular microarchitecture dependent grouping, such as branch mispredictions during the execution of test application software 485.

The dual cluster map diagram 600 of BBVs and FBVs presents unique opportunities to reduce the overall benchmarking complexity by reducing the amount of data that test application sampling software with FBV 404 analyzes after execution of test application software 485. For example, in one embodiment, test application sampling software with FBV 404 may reduce BBV cluster group BBVC1 620, that corresponds to a program phase, to a single representative BBV. The single representative BBV corresponds to one instruction interval, such as 10 million instructions of test application software 485. One method to reduce the overall complexity or size of the application software program is for the test application sampling software with FBV 404 to calculate the centroid or center of each cluster and choose the BBV that is closest to the centroid or center. The dark circle, or cluster data point nearest the centroid or center of cluster group BBVC1 620 is the BBV that most closely fits the parameters of all of the BBVs of that cluster group collectively.

Another technique that test application sampling software with FBV 404 may use to reduce each cluster group in size is to choose a BBV count and select that count or number of BBVs nearest the centroid of a cluster. For example, in one embodiment, test application sampling software with FBV 404 chooses a BBV count of 3, and the three dark points at the center of cluster group BBVC2 650 are BBVs that test application sampling software with FBV 404 selects as representative BBVs. To weight each cluster group properly, test application sampling software with FBV 404 may select a representative number of BBVs closest to the center of a particular cluster group, such as cluster group BBVC1 620. This representative number of BBVs corresponds to the total number or weight of instruction intervals that BBV cluster group BBVC1 620 contains. In this manner, test application sampling software with FBV 404 more properly weights each cluster group of cluster map diagram 600 equally. Many other weighting schemes are possible as well. Designers may select these methodologies by determining the best trade-off between simulation time, raw data for input, number crunching capability of the test system, and other factors.

Test application sampling software with FBV 404 may independently reduce FBV cluster groups in a similar fashion. However, a method is disclosed for reducing the BBV and FBV clusters cooperatively. The disclosed methodology uses a method of local instruction budgeting to satisfy IC designer requirements while developing reduced and representative test application software, such as representative test application software 490. IC designers assign an overall budget or total instruction size to representative test application software 490. In one example, designers assign a total budget size of 100 million instructions to representative test application software 490. In other words, in one embodiment, reduced and representative test application software 490 will contain a total of 100 million instructions that best matches or represents test application software 485.

Figure 7:
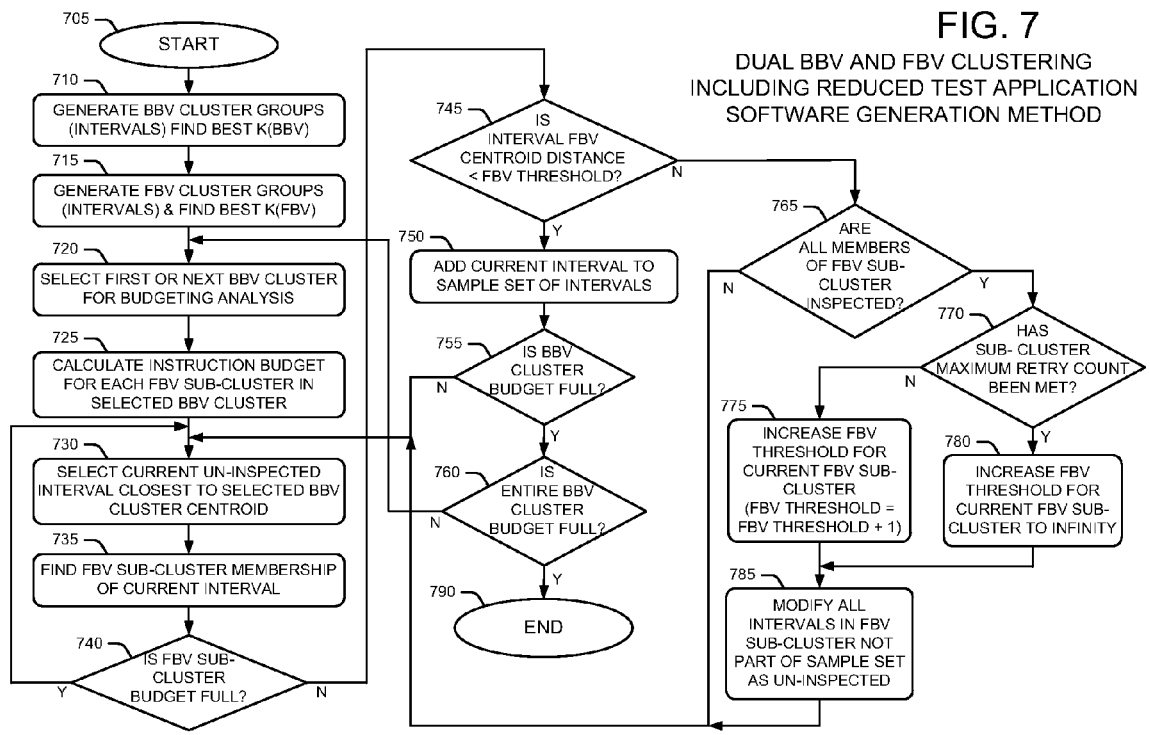
FIG. 7 is a flow chart that depicts the execution of test application sampling software with FBV and test application software on an IC design model with dual clustering using budgeting analysis in accordance with one embodiment of the disclosed methodology.

FIG. 7 is a flowchart that depicts the steps of a locally optimized dual clustering FBV method that generates representative test application software 490 from test application software 485 for use in test system 400. The method of FIG. 7 includes test application software analysis by program tools in test application sampling software, such as test application sampling software with FBV 404. The disclosed dual clustering FBV method begins at start block 705. Test application sampling software with FBV 404 generates BBV cluster groups, such as BBV cluster groups BBVC1 620, BBVC2 650 and other cluster groups not shown, and determines the best K(BBV), as per block 710. In one embodiment, K(BBV) is the number of BBV clusters that provides the best cluster, wherein "best" refers to a heuristic measurement that SimPoint software using Bayesian Information Criterion (BIC) may provide.

In one example as shown in the dual cluster map diagram 600 of FIG. 6, test application sampling software with FBV 404 selects 1 representative BBV for BBV cluster group BBVC1 620 indicating a selection of one instruction interval as the representative instruction interval for the entire BBV cluster group BBVC1 620. In the same example of dual cluster map diagram 600, test application sampling software with FBV 404 selects 3 BBVs of BBV cluster group BBVC2 650. In other words, test application sampling software with FBV 404 reduces the entire BBV cluster group BBVC2 650 to a representative three BBV instruction intervals as shown by the dark circles near the centroid of the BBV cluster group, namely BBVC2 650.

During generation of BBV clusters, test application sampling software with FBV 404 independently generates FBV clusters and finds the best K(FBV) per FBV cluster group, as per block 715. K(FBV) is the number of FBV clusters that provide the best cluster group clustering, wherein "best" refers to a heuristic measurement that SimPoint software using BIC may provide. Test application sampling software with FBV 404 chooses K(FBV) by using a method such as the K-Means method described above. K(BBV) and K(FBV) are tools of test application sampling software with FBV 404 that provide one clustering methodology to improve the representative accuracy of representative test application software 490.

Test application sampling software with FBV 404 generates cluster groups by executing one or more tracer programs during execution of test application software 485. Test application sampling software with FBV 404 executes and analyzes test application software 485 at a basic block level within the test system 400 that includes IC design model 480 as a virtual hardware model. During tracer program execution by test application sampling software with FBV 404, test application sampling software with FBV 404 may generate BBVs and respective independent FBVs consistent with those of the FBV format 500 of FIG. 5A.

Tracer programs provide information that identifies the instruction address of the first instruction of each basic block and the number of instructions in each basic block. Examples of tracer programs include, but are not limited to, the "C Library Trace Program" (CTrace), the "Maryland Applications for Measurement and Benchmarking of I/O On Parallel Computers" tracer program (Mambo), and the AriaPoint tracer program by Aria Technologies. Tracer programs may provide count information that specifies how many times the test application software 485 executes each basic block. In other words, tracer programs within test application sampling software with FBV 404 provide analysis of test application software 485, wherein that analysis provides input for the generation of BBVs.

During execution of test application software 485, test application sampling software with FBV 404 generates FBVs and then clusters the generated FBVs by counting microarchitecture dependent information that the FBVs contain. Each of these FBVs corresponds to the selected instruction interval, such as 10 million instructions of test application software 485. Instruction sampling instruction intervals of 1000 instructions, 1 million instructions, 100 million instructions and other sizes are potential alternatives, depending on the particular application. Sampling instruction interval size selection reflects the designer's desired performance resolution or detail, as well as the total allowable IC design performance modeling time available.

Test application sampling software with FBV 404 selects the first or next of each BBV cluster group for budgeting analysis, as per block 720. The representative test application software 490 includes as a total size requirement, namely a budget of 100 M instructions that IC designers or other entities select in this particular example. Test application sampling software with FBV 404 executes an instruction budget program and assigns each BBV cluster group, such as BBV cluster group BBVC1 620, a budgeting percentage in proportion to the total workload or entirety of instruction intervals of test application software 485. As shown in Table 1 below, test application sampling software with FBV 404 may assign each BBV cluster an instruction budget percentage in accordance with the total instruction budget.

TABLE 1

| BBV Cluster | Budgeting Percentage |
|---|---|
| BBVC1 | 50% |
| BBVC2 | 34% |
| BBVC3 | 11% |
| BBVC4 | 4% |
| BBVC5 | 1% |
| TOTAL | 100% |

For example, as shown in Table 1 above, BBV cluster BBVC1 620 contains a clustering of BBVs that represent 50% of the total BBVs or instruction intervals of the entire workload, such as test application software 485. BBV cluster group BBVC2 650 contains a clustering of BBVs that represent 34% of the total BBV count of test application software 485. BBVC3, BBVC4, BBVC5 (not shown in FIG. 6) correspond to 11%, 4%, and 1% respectively of the total BBV count of test application software 485. The total budgeting proportional percentages sum to 100% as shown in Table 1 above.

Test application sampling software with FBV 404 may multiply the total instruction budget goal of 100 M instruction times each budgeting percentage in Table 1 above to generate BBV cluster instruction budgets as seen in Table 2 below.

TABLE 2

| BBV Cluster | Instruction Budget |
|---|---|
| BBVC1 | 50 Million |
| BBVC2 | 34 Million |
| BBVC3 | 11 Million |
| BBVC4 | 4 Million |
| BBVC5 | 1 Million |
| TOTAL | 100 Million |

For example, as shown in Table 2 above, BBV cluster BBVC1 620 exhibits an instruction budget of 50 million instructions. In other words, BBVC1 620 contains a goal or clustering budget of 50 million instructions of representative test application software 490 that totals 100 million instructions. BBV cluster BBVC2 650 exhibits a clustering budget of 34 million instructions of the 100 million instructions of representative test application software 490. BBVC3, BBVC4, BBVC5 (not shown in FIG. 6) correspond to 11 million, 4 million, and 1 million instruction budgets, respectively, of the total instruction count of representative test application software 490. The total instruction budget sums to 100 million instructions as shown in the example of Table 2 above. After the instruction budgeting analysis, each BBV cluster of test application software 485 corresponds to a respective instruction budget proportion of the total 100 million instruction budget or goal for representative test application software 490.

Each FBV in an FBV cluster corresponds to a respective BBV in a particular BBV cluster. Each FBV and its corresponding respective BBV exhibit the same instruction interval in common. In other words, each instruction interval in a particular BBV cluster belongs to or is a member of some FBV cluster. The instruction intervals in a BBV cluster will exhibit FBV cluster memberships in some proportion that may not be the same as the overall or global FBV cluster proportions. For example, BBV cluster BBVC1 620 may exhibit a representative proportional relationship or membership percentage in each FBV cluster as shown in Table 3 below.

TABLE 3

| FBV Cluster | BBV Cluster BBVC1 Membership Percentage |
|---|---|
| FBVC1 | 58% |
| FBVC2 | 20% |
| FBVC3 | 18% |
| FBVC4 | 4% |
| TOTAL | 100% |

In this example, as shown in Table 3 above, BBVC1 620 exhibits a membership percentage of 58% in fly-by vector (FBV) cluster FBVC1 640. In other words, FBVC1 640 contains 58% of its total FBV count in common with corresponding instruction intervals, with those of BBVC1 620. BBV cluster BBVC1 620 exhibits a membership percentage of 20% in FBV cluster FBVC2 660. BBV cluster BBVC1 620 exhibits membership percentages of 18%, and 4% in FBV clusters FBVC3 and FBVC4 (not shown in FIG. 6, respectively. The total membership percentages sum to 100% as shown in Table 3 above. Test application sampling software with FBV 404 may multiply the percentages of Table 3 above by the total BBV cluster budgeting percentage, namely 50% for BBV cluster BBVC1 620, per Table 1 above to generate the FBV sub-cluster instruction budget shown below in Table 4.

TABLE 4

| FBV Cluster | FBV Sub-cluster Instruction Budget |
|---|---|
| FBVC1 | 29 Million |
| FBVC2 | 10 Million |
| FBVC3 | 9 Million |
| FBVC4 | 2 Million |
| TOTAL | 50 Million |

In the example shown in Table 4 above, FBV cluster FBVC1 640 exhibits an FBV sub-cluster instruction budget of 29 million instructions of the total instruction budget of BBVC1 620 of 50 million instructions. The FBV sub-cluster instruction budget corresponds to a "subset" of the total instruction budget of BBVC1 620. FBV cluster FBVC2 660 exhibits a FBV sub-cluster instruction budget of 10 million instructions of the total instruction budget of BBVC1 620 of 50 million instructions. FBVC3 and FBVC4 (not shown in FIG. 6) respectively correspond to a 9 million sub-cluster instruction budget and a 2 million FBV sub-cluster instruction budget of the total instruction budget of BBVC1 620 of 50 million instructions. The total of all FBV sub-cluster instruction budgets of the FBV clusters is 50 million instructions as shown in Table 4 above. As described above, the instruction budgets of FBV sub-clusters shown in Table 4 correspond to the multiplication of the BBVC1 membership percentages of Table 3 above with the total BBV cluster budgeting percentage of Table 1. In one embodiment, the FBV sub cluster instruction budgets as shown above in Table 4 correspond to the BBV cluster BBVC1 620 instruction budget only. In this manner, test application sampling software with FBV 404 calculates the instruction budget for each FBV sub-cluster, as per block 725.

If an FBV sub-cluster instruction budget calculation is less than 1 million instructions, test application sampling software with FBV 404 may set the budget to zero and ignore the impact of that FBV cluster on the particular BBV cluster analysis. The IC designer or other entity may set the threshold for dropping or ignoring a particular sub-cluster budget at any particular threshold value. The disclosed dual clustering FBV method using test application sampling software with FBV 404 may ensure that the instruction budgets for both BBV and FBV clusters are met. A goal of one embodiment of the disclosed methodology is to ensure that the instruction intervals of representative test application software 490 are as representative of the clusters as possible. In one embodiment, test application sampling software with FBV 404 places a priority on the BBV clusters since BBV cluster groups are known to predominantly reflect test application software program phases. BBV cluster groups more closely reflect a larger range of microarchitecture dependent elements of IC design model 480 than FBV cluster groups.

One method to ensure the priority of BBV clustering over FBV clustering is to select an instruction interval closest to the centroid of a particular BBV cluster under inspection. The closer the instruction interval is to the centroid of the particular BBV cluster, the greater that instruction interval represents or reflects the entire instruction set of that particular BBV cluster. Test application sampling software with FBV 404 selects the current "un-inspected" instruction interval for inspection closest to the centroid of the BBV cluster under analysis, as per block 730. As test application sampling software with FBV 404 inspects each instruction interval during execution of test application software 485, it marks the instruction interval as inspected. Alternatively, test application sampling software with FBV 404 marks each instruction interval that it has not yet inspected as "un-inspected". Test application sampling software with FBV 404 finds the sub-cluster membership of the current instruction interval, as per block 735. In other words, the current instruction interval under analysis in the current BBV cluster belongs to one and only one FBV sub-cluster, in one embodiment. Test application sampling software with FBV 404 finds that particular FBV sub-cluster membership as in the example of Table 4 above.

In one embodiment, the dual clustering FBV method seeks to meet each sub-cluster instruction budget per each BBV cluster instruction budget. As per the example of Table 4, each FBV cluster, namely FBVC1, FBVC2, FBVC3 and FBVC4, accumulate up to their total instruction budget allocations of 29, 10, 9, and 2 million instructions, respectively. These are the instruction budgets for BBV cluster BBVC1 620. Test application sampling software with FBV 404 compiles FBV sub-cluster instruction budgets for each BBV cluster under analysis. In this example, if the FBV sub-cluster budget is full, test application sampling software with FBV 404 selects a new current instruction interval closest to the BBV cluster centroid, as per decision block 740. However if the FBV sub-cluster budget is not full, then test application sampling software with FBV 404 performs a test to determine if the current interval's distance from the interval's FBV centroid is less than the FBV threshold, as per decision block 745.

The IC designer may preset the FBV threshold prior to execution of test application sampling software with FBV 404. The FBV threshold is one of multiple parameters that IC designers can preset to modify the operating constraints of the programs of test application sampling software with FBV 404. Other parameters, such as the total representative test application 490 instruction budget, allow IC designers flexibility in managing trade-offs between CPI error reduction, total operating time, and other characteristics of the IC design benchmarking process.

Distance from the BBV cluster's centroid is a dominant factor in the decision to include or not include an instruction interval in the sample set of instruction intervals. This factor is more important than the distance of the instruction interval from the corresponding FBV cluster centroid. The FBV threshold provides a mechanism to control the sensitivity of instruction interval selection by test application sampling software with FBV 404 during execution and analysis of test application software 485. The lower the FBV threshold, the more representative the instruction intervals will be of the FBV clusters. However, very low FBV threshold values may make it impossible to find intervals in the FBV sub-clusters that are also within the FBV threshold distance from their FBV centroid.

If the interval's distance to the current FBV centroid is less than the preset FBV threshold value at decision block 745, then test application sampling software with FBV 404 adds the current interval to a sample set of intervals, as per block 750. The sample set of instruction intervals is an intermediate set of instruction intervals that test application sampling software with FBV 404 stores during the compilation of the entire set of instruction intervals for analysis and ultimate generation of representative test application software 490.

Test application sampling software with FBV 404 inspects the budget requirements for the current BBV cluster, such as the budget requirements for BBVC1 620 from Table 2 above, namely 50 million instructions. Test application sampling software with FBV 404 inspects the budget requirements to determine if the BBV cluster budget is full, as per decision block 755. If the BBV cluster budget is not full, test application sampling software with FBV 404 selects the next current "un-inspected" instruction interval closest to the BBV cluster centroid, again as per block 730, and flow continues. However, if the BBV cluster budget is full, then test application sampling software with FBV 404 performs a test to determine if the budget for every BBV cluster is full, as per decision block 760. If the budget for the entire group of BBV clusters, such as BBVC1, BBVC2, BBVC3, BBVC4, and BBVC5 as shown in Table 1 are not met, test application sampling software with FBV 404 selects the next BBV cluster for budgeting analysis again as per block 720, and flow continues.

As stated above, each BBV cluster, such as BBVC1 620 may exhibit a representative proportional relationship or membership percentage in each FBV cluster as shown in Table 3 above. Each BBV is a member of one FBV cluster. Test application sampling software with FBV 404 performs a test to determine if inspection is complete for all BBVs or members of the current FBV sub-cluster, as per decision block 765. If inspection of all members of the current FBV sub-cluster under inspection is not complete, test application sampling software with FBV 404 selects a new current "un-inspected" interval closet to the BBV cluster centroid again per block 730, and flow continues.

IC designers may preset the FBV threshold and provide automatic or other changes to the FBV threshold during execution of test application sampling software with FBV 404. It is possible for the FBV threshold to be so small that test application sampling software with FBV 404 encounters a significant number of iterations to achieve the sub-cluster budgeting. To avoid an unreasonable number of such iterations and the resulting run time consumption, IC designers may set a maximum retry count parameter for each sub-cluster budget generation. Test application sampling software with FBV 404 performs a test to determine if the current sub-cluster budgeting method meets the sub-cluster maximum allowable retry count, as per decision block 770. If the sub-cluster maximum retry count is not yet met, test application sampling software with FBV 404 increases the FBV threshold for the current sub-cluster, (FBV threshold=FBV threshold+1), as per block 775. Increasing the FBV threshold gives test application sampling software with FBV 404 the potential to allow more instruction intervals to satisfy the sub-cluster budgeting requirements.

If the sub-cluster maximum retry count is met, test application sampling software with FBV 404 increases the FBV threshold for the current sub-cluster to infinity, as per block 780. Increasing the FBV threshold to infinity allows all corresponding intervals to be potential candidates for the sub-cluster budgeting requirements. If the FBV threshold changes per block 775, or block 780, test application sampling software with FBV 404 may modify all remaining instruction intervals in the current FBV sub-cluster that are not part of sample set as "un-inspected" intervals, as per block 785. Test application sampling software with FBV 404 selects a new current "un-inspected" instruction interval closet to the BBV cluster centroid again as per block 730, and flow continues until the entire BBV cluster budget is full, as per decision block 760. The dual clustering FBV method then ends at end block 790.

The reduced representative test application software 490 is representative of the larger test application software 485 even though representative test application software 490 includes substantially fewer instructions than the larger test application software 485 from which it comes. In other words, while test application sampling software with FBV 404 executes the representative test application software 490, the IC design model 480 responds in close approximation to that of the original test application software 485. The more closely the representative test application software 490 approximates execution on IC design model 480 to test application software 485, the more efficient and effective the benchmarking process becomes.

The foregoing discloses methodologies wherein an IC design test system employs test application sampling software to provide IC design personnel with IC design system tools for simulation, design benchmarking, and other analysis. In one embodiment, test application sampling software initiates multiple programs such as instruction trace, simulation point sampling, fly-by vector generation, and K-Means clustering analysis. Designers may use the test application sampling software tools to perform IC design model performance and benchmarking analysis.

Modifications and alternative embodiments of this invention will be apparent to those skilled in the art in view of this description of the invention. Accordingly, this description teaches those skilled in the art the manner of carrying out the invention and is intended to be construed as illustrative only. The forms of the invention shown and described constitute the present embodiments. Persons skilled in the art may make various changes in the shape, size and arrangement of parts. For example, persons skilled in the art may substitute equivalent elements for the elements illustrated and described here. Moreover, persons skilled in the art after having the benefit of this description of the invention may use certain features of the invention independently of the use of other features, without departing from the scope of the invention.

What is claimed is:

1. A method of integrated circuit (IC) design model testing, comprising:
   receiving a workload, by a simulator test information handling system (IHS) that includes the IC design model, the workload including test application software exhibiting a first predetermined number of instructions;
   grouping, by the simulator test IHS, the workload into a plurality of instruction intervals, each instruction interval including a second predetermined number of instructions of the workload;
   generating, by the simulator test IHS, a plurality of basic block vectors (BBVs), each BBV being generated for a respective instruction interval;
   generating, by the simulator test IHS, a respective fly-by vector (FBV) for each BBV generated by the simulator test system, each FBV being generated independently of its respective BBV, but having in common a same instruction interval, each FBV including microarchitecture dependent information;
   clustering, by the simulator test IHS, the BBVs to form BBV cluster groups that represent code profile phases of the workload;
   clustering, by the simulator test IHS, the FBVs to form FBV cluster groups that represent microarchitecture dependent phases of the workload, the FBV clustering being independent of the BBV clustering; and
   generating, by the simulator test IHS, a reduced representative workload as specified by a total instruction budget that includes a BBV instruction budget and an FBV instruction budget.

2. The method of claim 1, further comprising:
   generating, by the simulator test IHS, one or more BBV selections representative of a particular BBV cluster group to satisfy the BBV instruction budget;
   generating, by the simulator test IHS, one or more FBV selections representative of a particular FBV cluster group to satisfy the FBV instruction budget;
   generating, by the simulator test IHS, one or more BBV selections representative of a particular BBV cluster group to satisfy both the BBV instruction budget and the FBV instruction budget together.

3. The method of claim 1, wherein the microarchitecture dependent information in an FBV includes one of cache miss count information, branch misprediction count information and CPI error information.

4. The method of claim 1, further comprising reducing to one or more representative BBVs, by the simulator test IHS, a particular BBV cluster group that corresponds to a code profile phase.

5. The method of claim 1, further comprising executing, by the simulator test IHS, the reduced representative workload on the IC design model.

6. An integrated circuit (IC) design model simulator test information handling system (IHS) comprising:
   a processor;
   a memory store, coupled to the processor, the memory store including an IC design model, the memory store being configured to:

receive a workload including test application software exhibiting a first predetermined number of instructions;

group the instructions of the workload into a plurality of instruction intervals, each instruction interval including a second predetermined number of instructions of the workload;

generate from the instructions of each instruction interval a respective basic block vector (BBV) corresponding to each instruction interval; and generate a respective fly-by vector (FBV) for each BBV generated by the simulator test system, each FBV being generated independently of its respective BBV, but having in common a same instruction interval, each FBV including microarchitecture dependent information;

cluster the BBVs to form BBV cluster groups that represent code profile phases of the workload;

cluster the FBVs to form FBV cluster groups that represent microarchitecture dependent code profile phases of the workload, the FBV clustering being independent of the BBV clustering; and generate a reduced representative workload as specified by a total instruction budget that includes a BBV instruction budget and an FBV instruction budget.

7. The simulator test IHS of claim 6, wherein the memory store is further configured to:

generate one or more BBV selections representative of a particular BBV cluster group to satisfy the BBV instruction budget;

generate one or more FBV selections representative of a particular FBV cluster group to satisfy the FBV instruction budget;

generate one or more BBV selections representative of a particular BBV cluster group to satisfy both the BBV instruction budget and the FBV instruction budget together.

8. The simulator test IHS of claim 6, wherein the microarchitecture dependent information in an FBV includes one of cache miss count information, branch misprediction count information and CPI error information.

9. The simulator test IHS of claim 6, wherein the memory store is further configured to reduce to one or more representative BBVs a particular BBV cluster group that corresponds to a code file phase.

10. The simulator test IHS of claim 6, wherein the memory store is further configured to execute the reduced representative workload on an IC design model.

11. A computer program product stored on a computer operable medium and executed by a simulator test information handling system (IHS), the computer program product including instructions that when executed by the simulator test IHS perform the steps comprising:

receiving a workload including test application software exhibiting a first predetermined number of instructions;

grouping the instructions of the workload into a plurality of instruction intervals, each instruction interval including a second predetermined number of instructions of the workload;

generating from the instructions of each instruction interval a respective basic block vector (BBV) corresponding to each instruction interval;

generating a respective fly-by vector (FBV) for each BBV generated by the simulator test IHS, each FBV being generated independently of its respective BBV, but having in common a same instruction interval, each FBV including microarchitecture dependent information;

clustering the BBVs to form BBV cluster groups that represent code profile phases of the workload;

clustering the FBVs to form FBV cluster groups that represent microarchitecture dependent phases of the workload, the FBV clustering being independent of the BBV clustering; and instructions that generate a reduced representative workload as specified by a total instruction budget that includes a BBV instruction budget and an FBV instruction budget.

12. The computer program product of claim 11, wherein the computer program product further includes instructions that when executed by the simulator test IHS perform the steps comprising:

generating a BBV selection representative of one or more particular BBV cluster groups to satisfy the BBV instruction budget;

generating an FBV selection representative of one or more particular FBV cluster groups to satisfy the FBV instruction budget; and generating one or more BBV selections representative of particular BBV cluster group to satisfy both the BBV instruction budget and the FBV instruction budget together.

13. The computer program product of claim 11, wherein the microarchitecture dependent information in an FBV includes one of cache miss count information, branch misprediction count information and CPI error information.

14. The computer program product of claim 11, wherein the computer program product further includes instructions that when executed by the simulatort test IHS perform the step comprising:

reducing to one or more representative BBVs a particular BBV cluster group that corresponds to a code profile phase.

* * * * *